United States Patent
Fukuda et al.

(10) Patent No.: US 8,409,536 B2
(45) Date of Patent: Apr. 2, 2013

(54) EXHAUST GAS PURIFICATION APPARATUS OF AN INTERNAL COMBUSTION ENGINE

(75) Inventors: Koichiro Fukuda, Numazu (JP); Shinya Hirota, Susono (JP); Shunsuke Toshioka, Susono (JP); Sakutaro Hoshi, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/395,766

(22) PCT Filed: May 14, 2010

(86) PCT No.: PCT/JP2010/058193
§ 371 (c)(1),
(2), (4) Date: Mar. 13, 2012

(87) PCT Pub. No.: WO2011/142028
PCT Pub. Date: Nov. 17, 2011

(65) Prior Publication Data
US 2013/0052107 A1    Feb. 28, 2013

(51) Int. Cl.
*B01D 53/56* (2006.01)
*B01D 53/94* (2006.01)
*F01N 3/10* (2006.01)

(52) U.S. Cl. ............ 423/213.2; 423/239.1; 423/DIG. 5; 60/299; 60/301

(58) Field of Classification Search ............... 423/213.2, 423/239.1, DIG. 5; 60/299, 301
See application file for complete search history.

(56) References Cited

U.S. PATENT DOCUMENTS

| | | |
|---|---|---|
| 2003/0182935 A1 | 10/2003 | Kawai et al. |
| 2009/0288396 A1 | 11/2009 | Sakata et al. |
| 2009/0293459 A1 | 12/2009 | Shimomura et al. |
| 2011/0061370 A1 | 3/2011 | Aoyama et al. |
| 2012/0308459 A1* | 12/2012 | Guo .................. 423/239.1 |

FOREIGN PATENT DOCUMENTS

| | | |
|---|---|---|
| JP | A-2003-293737 | 10/2003 |
| JP | A-2005-127256 | 5/2005 |
| JP | A-2005-226504 | 8/2005 |
| JP | A-2008-261253 | 10/2008 |
| JP | A-2009-197728 | 9/2009 |
| JP | A-2009-281294 | 12/2009 |
| JP | A-2009-293444 | 12/2009 |
| JP | A-2012-17674 | 1/2012 |

OTHER PUBLICATIONS

Aug. 24, 2010 International Search Report issued in International Patent Application No. PCT/JP2010/058193 (with translation).

* cited by examiner

*Primary Examiner* — Timothy Vanoy
(74) *Attorney, Agent, or Firm* — Oliff & Berridge, PLC (57) ABSTRACT

A technique that, in an exhaust gas purification apparatus of an internal combustion engine, can avoid a decrease in a NOx purification rate by adding a reducing agent as continuously as possible, while avoiding $NH_3$ from passing through a selective reduction type NOx catalyst to a downstream side thereof. The selective reduction type NOx catalyst has an active spot which purifies NOx by the use of $NH_3$, and an adsorption site which adsorbs $NH_3$, wherein a vicinity site, which is located in the vicinity of the active spot, and a distant site, which is located distant from the active spot, exist in the adsorption site. The addition of the reducing agent from the reducing agent addition part is controlled based on the desorption rate of $NH_3$ in the vicinity site so as to continue to cause the $NH_3$ adsorbed to the vicinity site to exist.

6 Claims, 9 Drawing Sheets

EXHAUST GAS PURIFICATION APPARATUS OF AN INTERNAL COMBUSTION ENGINE

TECHNICAL FIELD

The present invention relates to an exhaust gas purification apparatus of an internal combustion engine.

BACKGROUND ART

In a first patent document, there is disclosed that an oxidation catalyst, a reducing agent addition valve, and a selective reduction type NOx catalyst (hereinafter referred to as an SCR catalyst) are arranged in an exhaust passage of an internal combustion engine sequentially from upstream to downstream, wherein the addition of a reducing agent from the reducing agent addition valve is controlled in accordance with an amount of NOx in an exhaust gas flowing into the SCR catalyst, and the bed temperature of the SCR catalyst. In the first patent document, the use of two kinds of methods is disclosed as a method of adding the reducing agent.

A first method thereof is one in which an amount of NOx, which is discharged from the internal combustion engine and flows into the SCR catalyst, is estimated, and an amount of reducing agent corresponding only to the amount of NOx thus estimated (for example, an equivalent ratio of 1) is added in a continuous manner. In this case, due to a response delay in control of the supply of the reducing agent, a delay until the reducing agent is hydrolyzed to $NH_3$, and so on, it is not possible to timely deal with the case where the amount of discharge of NOx from the internal combustion engine has changed rapidly, so it is difficult to provide an appropriate amount of addition of the reducing agent. For that reason, $NH_3$ can pass through the SCR catalyst to a downstream side thereof due to the excessive addition of the reducing agent, or a NOx purification rate can be made lower due to the shortage of addition of the reducing agent.

A second method is one in which by making use of a function of the SCR catalyst to adsorb $NH_3$, $NH_3$ is caused to be beforehand adsorbed to and stored or held in the SCR catalyst within a range which does not exceed a saturated amount of adsorption, and as the $NH_3$ held by the SCR catalyst is consumed by the reduction of NOx, an amount of reducing agent only corresponding to an amount of $NH_3$ thus consumed is supplied. In this case, in comparison with the first method, there is no response delay, and it is easy to deal with a rapid change in the amount of NOx, so in the past, the second method has mainly been adopted. Here, in the second method, it has been considered that the amount of $NH_3$, which is caused to be adsorbed to the SCR catalyst, is preferably as much as possible as long as it does not exceed the saturated amount of adsorption, as disclosed in a fourth patent document.

PRIOR ART REFERENCES

Patent Documents

First Patent Document: Japanese patent application laid-open No. 2008-261253
Second Patent Document: Japanese patent application laid-open No. 2009-293444
Third Patent Document: Japanese patent application laid-open No. 2005-226504
Fourth Patent Document: Japanese patent application laid-open No. 2005-127256

SUMMARY OF THE INVENTION

Problems To Be Solved By The Invention

However, according to the knowledge of the present inventors, it has been found out that in cases where the $NH_3$ required for the purification of NOx is caused to be beforehand adsorbed to the SCR catalyst and thereafter the addition of the reducing agent is stopped, the NOx purification rate becomes lower as compared with the case where the reducing agent is continuously added even if $NH_3$ has been adsorbed.

The present invention has been made in view of the above-mentioned circumstances, and has for its object to provide a technique which, in an exhaust gas purification apparatus of an internal combustion engine, can avoid a decrease in a NOx purification rate by adding a reducing agent as continuously as possible, while avoiding $NH_3$ from passing through a selective reduction type NOx catalyst to a downstream side thereof.

Means For Solving The Problems

In the present invention, the following construction is adopted.

That is, the present invention resides in an exhaust gas purification apparatus of an internal combustion engine which comprises:

a selective reduction type NOx catalyst that is arranged in an exhaust passage of the internal combustion engine; and a reducing agent addition part that is arranged in said exhaust passage at an upstream side of said selective reduction type NOx catalyst, and adds a reducing agent for supplying $NH_3$ to said selective reduction type NOx catalyst;

wherein said selective reduction type NOx catalyst has an active spot which purifies NOx by the use of $NH_3$, and an adsorption site which adsorbs $NH_3$;

a vicinity site, which is located in the vicinity of said active spot, and a distant site, which is located distance from said active spot, exist in said adsorption site;

said vicinity site tends to deliver $NH_3$ to said active spot more easily than said distant site does, and the desorption rate of $NH_3$ in said vicinity site is faster than the desorption rate of $NH_3$ in said distant site; and a control part is provided which controls the addition of the reducing agent from said reducing agent addition part based on the desorption rate of $NH_3$ in said vicinity site so as to continue to cause the $NH_3$ adsorbed to said vicinity site to exist.

According to the knowledge of the present inventors, it has been found out that in cases where $NH_3$ required for the purification of NOx is caused to be beforehand adsorbed to the selective reduction type NOx catalyst, and thereafter the addition of the reducing agent is stopped, the NOx purification rate becomes lower, as compared with the case where the reducing agent is added in a continuous manner, even if $NH_3$ has been adsorbed.

This is considered due to the following reasons. In the selective reduction type NOx catalyst, active spots which serve to purify NOx by the use of $NH_3$ are dotted, and at the same time, adsorption sites which serve to adsorb $NH_3$ exist. Vicinity sites in the vicinity of the active spots, among the adsorption sites, are easier to deliver $NH_3$ to the active spots than distant sites at the distance from the active spots. For this reason, the desorption rate of $NH_3$ in the vicinity sites due to the delivery of $NH_3$ to the active spots is faster than the desorption rate of $NH_3$ in the distant sites. In other words, most of the $NH_3$ used in an active spot is that which has been adsorbed to its vicinity sites, and the $NH_3$ adsorbed to the distant sites is difficult to be used in the active spot, and is difficult to contribute to the purification of the NOx. As a result, continuing to supply $NH_3$ to the vicinity sites by adding the reducing agent in a continuous manner is able to purify the NOx more easily than using the $NH_3$ adsorbed to the distant sites by causing it to be desorbed therefrom. For this reason, it is considered that the NOx purification rate becomes higher in the case of adding the reducing agent in a continuous manner than in the case of causing the $NH_3$ required for the purification of the NOx to be beforehand adsorbed to the selective reduction type NOx catalyst, and thereafter stopping the addition of the reducing agent.

Accordingly, in the present invention, the addition of the reducing agent from the reducing agent addition part is controlled based on the desorption rate of $NH_3$ in the vicinity sites so as to continue to cause the $NH_3$ adsorbed to the vicinity sites to exist. In other words, the reducing agent is continued as much as possible to be supplied from the reducing agent addition part, so that even if the vicinity sites deliver $NH_3$ to the active spot and the $NH_3$ is desorbed from the vicinity sites, new $NH_3$ can be caused to be adsorbed to the vicinity sites immediately. According to this, $NH_3$ is caused to continue to exist in the vicinity sites as much as possible, so the $NH_3$ adsorbed to the vicinity sites can always be delivered to the active spot, thereby making it possible to purify NOx. As a result, it is possible to maintain the NOx purification rate high.

Here, in the present invention, attention is focused on the desorption rate of $NH_3$ in the vicinity sites. The desorption rate of $NH_3$ in the vicinity sites is a rate from the time when $NH_3$ is caused to be adsorbed to the vicinity sites until the time when the $NH_3$ is delivered to the active spot, and it can also be said as the rate of consumption of $NH_3$ in the vicinity sites. If the supply of $NH_3$ is slower with respect to the desorption rate of $NH_3$ in the vicinity sites, the vicinity sites will be in a state where the $NH_3$ is not adsorbed to the vicinity sites, so it becomes impossible to purify the NOx, resulting in a decrease in the NOx purification rate. On the other hand, if the supply of $NH_3$ is faster with respect to the desorption rate of $NH_3$ in the vicinity sites, not only the vicinity sites but also the distant sites will adsorb the $NH_3$, so the saturation of the amount of adsorption of $NH_3$ in the selective reduction type NOx catalyst will be caused, thus giving rise to the passage of $NH_3$ through to the downstream side of the selective reduction type NOx catalyst. For this reason, the reducing agent is added in consideration of the desorption rate of $NH_3$ in the vicinity sites, so that the rate of supply of $NH_3$ becomes optimal with respect to the desorption rate of $NH_3$ in the vicinity sites, thus enabling $NH_3$ to continue to exist in the vicinity sites.

According to the present invention, by adding the reducing agent as continuously as possible, a decrease in the NOx purification rate can be avoided. In addition, the amount of the reducing agent to be added continuously is only an amount of addition thereof which causes the $NH_3$ adsorbed to the vicinity sites to continue to exist, and the reducing agent is not added excessively, so it is also possible to avoid the $NH_3$ from passing through to the downstream side of the selective reduction type NOx catalyst.

In addition, according to the present invention, the $NH_3$ adsorbed to the vicinity sites continues to exist, so a response delay in the supply control of the reducing agent, a delay until the reducing agent is hydrolyzed into $NH_3$, and so on, can be absorbed by the $NH_3$ adsorbed to the vicinity sites. For this reason, even in cases where the amount of NOx discharged from the internal combustion engine has changed rapidly, appropriate measures can be taken in time, thereby making it possible to provide an optimal amount of addition of the reducing agent. As a result, it is difficult for $NH_3$ to pass through to the downstream side of the selective reduction type NOx catalyst due to the excessive addition of the reducing agent, or a decrease in the NOx purification rate due to the shortage of addition of the reducing agent is difficult to occur.

Preferably, said control part continues to add the reducing agent until the amount of adsorption of $NH_3$ in said selective reduction type NOx catalyst comes near its saturation.

According to this, it is possible to maintain a high NOx purification rate by continuing to supply $NH_3$ to the vicinity sites until the time the amount of adsorption of $NH_3$ in the selective reduction type NOx catalyst comes near its saturation to cause a fear that the $NH_3$ may pass through to the downstream side of the selective reduction type NOx catalyst.

Preferably, in cases where $NH_3$ has not been adsorbed to said vicinity sites, said control part adds the reducing agent in an amount increased from that in cases where the $NH_3$ adsorbed to said vicinity sites is caused to continue to exist.

According to this, in cases where $NH_3$ has not been adsorbed to the vicinity sites, by increasing the amount of the reducing agent to be added, the hydrolyzation of the reducing agent can be facilitated to cause the vicinity sites to ensure $NH_3$ at an early stage, thus making it possible to enhance the NOx purification rate.

Preferably, provision is made for an addition amount calculation part that calculates, based on the desorption rate of $NH_3$ in said vicinity sites and an amount of NOx flowing into said selective reduction type NOx catalyst, a predetermined equivalent ratio addition amount, which causes the $NH_3$ adsorbed to said vicinity sites to continue to exist, of the reducing agent to be added from said reducing agent addition part, wherein said control part adds the reducing agent in an amount more than the predetermined equivalent ratio addition amount in cases where $NH_3$ has not been adsorbed to said vicinity sites, based on the predetermined equivalent ratio addition amount calculated by said addition amount calculation part, adds the reducing agent in the predetermined equivalent ratio addition amount in cases where the $NH_3$ adsorbed to said vicinity sites is caused to continue to exist, and adds the reducing agent in an amount less than the predetermined equivalent ratio addition amount or stops the addition of the reducing agent in cases where the amount of adsorption of $NH_3$ in said selective reduction type NOx catalyst has come near its saturation.

Here, the predetermined equivalent ratio addition amount is an amount of addition which can cause the $NH_3$ adsorbed to the vicinity sites to continue to exist, while purifying NOx by the selective reduction type NOx catalyst, by taking into consideration the desorption rate of $NH_3$ in the vicinity sites and the amount of NOx flowing into the selective reduction type NOx catalyst. For example, the predetermined equivalent ratio addition amount is an amount of addition of the reducing agent in which the equivalent ratio thereof, being the ratio of the amount of substance of $NH_3$, which performs a reaction with NOx, to the amount of substance of NOx, is an equivalent ratio of around 1 or other values. The predetermined equivalent ratio addition amount may also be an amount with its equivalent ratio being relatively fixed with respect to the amount of NOx flowing into the selective reduction type NOx catalyst, or may also be an amount with its equivalent ratio being changed in accordance with situations such as the amount of NOx, the catalytic state of the catalyst, etc..

According to this, the predetermined equivalent ratio addition amount in which the $NH_3$ adsorbed to the vicinity sites is caused to continue to exist is calculated, so in cases where the NH$_3$ adsorbed to the vicinity sites is caused to continue to exist, an optimal amount of reducing agent, which is the predetermined equivalent ratio addition amount, can continue to be added, thus making it possible to maintain a high NOx purification rate. In addition, in cases where NH$_3$ has not been adsorbed to the vicinity sites, by adding an amount of reducing agent more than the predetermined equivalent ratio addition amount, NH$_3$ can be caused to be adsorbed to the vicinity sites at an early stage, thus making it possible to enhance the NOx purification rate. Moreover, in cases where the amount of adsorption of NH$_3$ in the selective reduction type NOx catalyst comes near its saturation, it is possible to maintain the NOx purification rate over a long period of time by making long the time of continuation of addition even in a small amount, rather than by continuing the addition at a predetermined equivalent ratio and stopping the addition at an early stage, as a consequence of which it is possible to avoid NH$_3$ from passing through to the downstream side of the selective reduction type NOx catalyst by adding an amount of reducing agent which is smaller than the predetermined equivalent ratio addition amount, or by stopping the addition of the reducing agent.

Preferably, provision is made for:

a first NOx concentration acquisition part that acquires the concentration of NOx in an exhaust gas which flows into said selective reduction type NOx catalyst;

a second NOx concentration acquisition part that acquires the concentration of NOx in an exhaust gas which flows out of said selective reduction type NOx catalyst;

a NOx purification rate calculation part that calculates a NOx purification rate in said selective reduction type NOx catalyst from the NOx concentrations acquired by said first NOx concentration acquisition part and said second NOx concentration acquisition part;

a temperature detection part that detects the temperature of said selective reduction type NOx catalyst;

an adsorption amount estimation part that estimates the amount of adsorption of NH$_3$ in said selective reduction type NOx catalyst based on the NOx purification rate calculated by said NOx purification rate calculation part and the catalyst temperature detected by said catalyst temperature detection part; and an addition amount calculation part that calculates a predetermined equivalent ratio addition amount, which causes the NH$_3$ adsorbed to said vicinity sites to continue to exist, of the reducing agent to be added from said reducing agent addition part, based on the desorption rate of NH$_3$ in said vicinity sites, and an amount of NOx flowing into said selective reduction type NOx catalyst which is calculated from the NOx concentration acquired by the first NOx concentration acquisition part and an amount of air;

wherein a first target adsorption amount, which becomes a threshold value for whether NH$_3$ has not been adsorbed to said vicinity sites in said selective reduction type NOx catalyst or NH$_3$ has been adsorbed to said vicinity sites, and a second target adsorption amount, which is more than the first target adsorption amount and which becomes a threshold value for whether the amount of adsorption of NH$_3$ in said selective reduction type NOx catalyst does not come near its saturation or the amount of adsorption thereof comes near its saturation, are set; and wherein said control part adds the reducing agent in an amount more than the predetermined equivalent ratio addition amount in cases where the amount of adsorption estimated by said adsorption amount estimation part is less than the first target adsorption amount, based on the predetermined equivalent ratio addition amount calculated by said addition amount calculation part, adds the reducing agent in the predetermined equivalent ratio addition amount in cases where the amount of adsorption estimated by said adsorption amount estimation part is equal to or more than the first target adsorption amount and is less than the second target adsorption amount, and adds the reducing agent in an amount less than the predetermined equivalent ratio addition amount or stops the addition of the reducing agent in cases where the amount of adsorption estimated by said adsorption amount estimation part is equal to or more than the second target adsorption amount.

According to this, the predetermined equivalent ratio addition amount in which the NH$_3$ adsorbed to the vicinity sites is caused to continue to exist is calculated, so in cases where the amount of adsorption estimated by the adsorption amount estimation part is equal to or more than the first target adsorption amount and is less than the second target adsorption amount, i.e., the NH$_3$ adsorbed to the vicinity sites is caused to continue to exist, an optimal amount of reducing agent, which is the predetermined equivalent ratio addition amount, can continue to be added, thus making it possible to maintain a high NOx purification rate. In addition, in cases where the amount of adsorption estimated by the adsorption amount estimation part is less than the first target adsorption amount, i.e., NH$_3$ has not been adsorbed to the vicinity sites, by adding an amount of reducing agent more than the predetermined equivalent ratio addition amount, NH$_3$ can be caused to be adsorbed to the vicinity sites at an early stage. Moreover, in cases where the amount of adsorption estimated by the adsorption amount estimation part is equal to or more than the second target adsorption amount, i.e., the amount of adsorption of NH$_3$ in the selective reduction type NOx catalyst has come near its saturation, it is possible to avoid NH$_3$ from passing through to the downstream side of the selective reduction type NOx catalyst by adding an amount of reducing agent which is smaller than the predetermined equivalent ratio addition amount, or by stopping the addition of the reducing agent.

In another aspect of the present invention, there is provided a reducing agent addition method in an exhaust gas purification apparatus of an internal combustion engine which is provided with:

a selective reduction type NOx catalyst that is arranged in an exhaust passage of the internal combustion engine; and a reducing agent addition part that is arranged in said exhaust passage at an upstream side of said selective reduction type NOx catalyst, and adds a reducing agent for supplying NH$_3$ to said selective reduction type NOx catalyst;

wherein said selective reduction type NOx catalyst has an active spot which purifies NOx by the use of NH$_3$, and an adsorption site which adsorbs NH$_3$;

a vicinity site, which is located in the vicinity of said active spot, and a distant site, which is located distant from said active spot, exist in said adsorption site;

said vicinity site tends to deliver NH$_3$ to said active spot more easily than said distant site does, and the desorption rate of NH$_3$ in said vicinity site is faster than the desorption rate of NH$_3$ in said distant site; and the addition of the reducing agent from said reducing agent addition part is controlled based on the desorption rate of NH$_3$ in said vicinity site so as to continue to cause the NH$_3$ adsorbed to said vicinity site to exist.

In this invention, too, it is possible to avoid a decrease in the NOx purification rate by adding the reducing agent as continuously as possible, while avoiding NH₃ from passing through to the downstream side of the selective reduction type NOx catalyst.

Effect of the Invention

According to the present invention, in an exhaust gas purification apparatus of an internal combustion engine, it is possible to avoid a decrease in a NOx purification rate by adding a reducing agent as continuously as possible, while avoiding NH₃ from passing through a selective reduction type NOx catalyst to a downstream side thereof.

BEST MODES FOR CARRYING OUT THE INVENTION

Hereinafter, a specific embodiment of the present invention will be described.

First Embodiment (Internal Combustion Engine)

Figure 1:
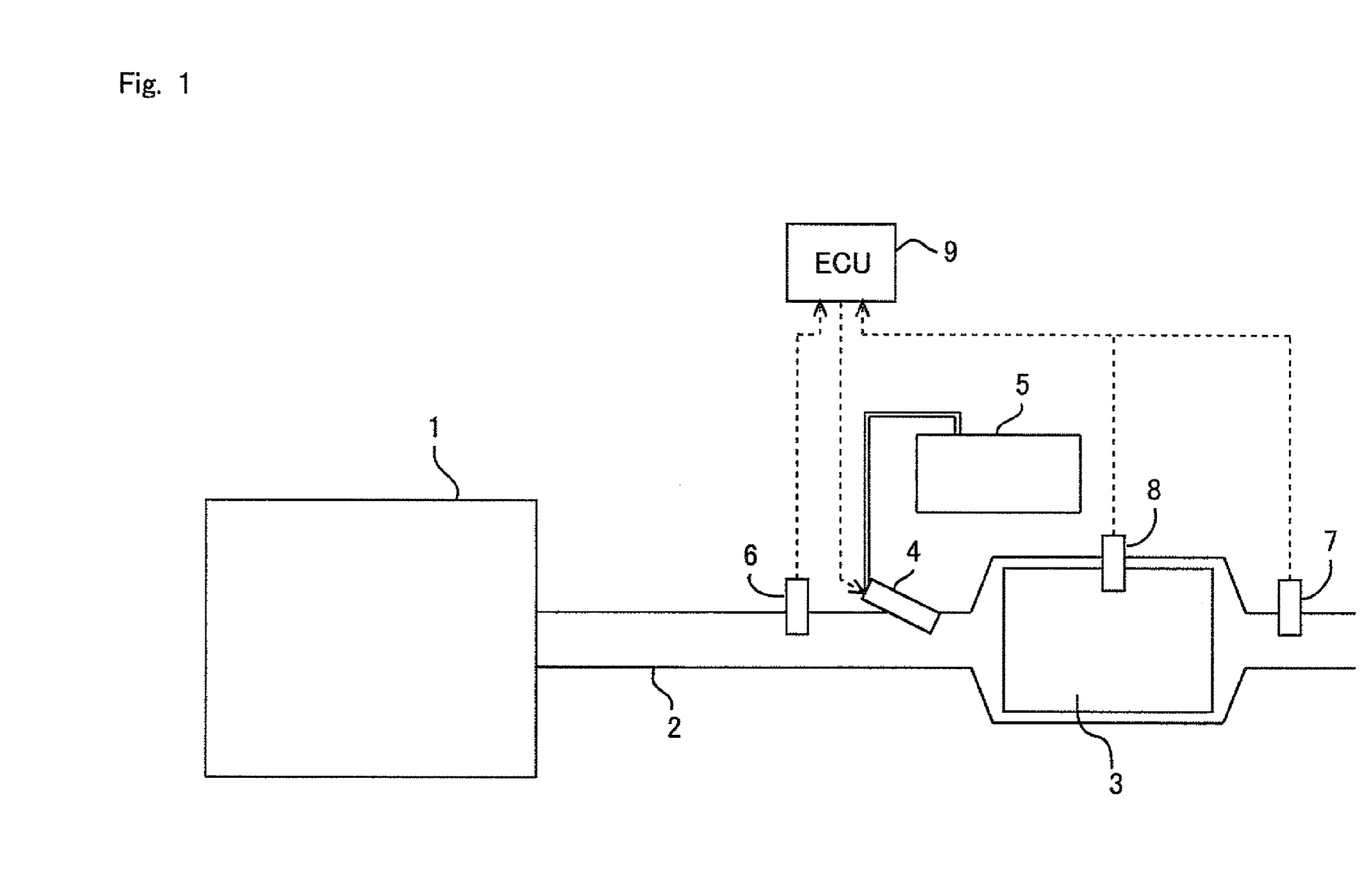
FIG. 1 is a view showing the schematic construction of an internal combustion engine according to a first embodiment of the present invention.

FIG. 1 is a view showing the schematic construction of an internal combustion engine according to a first embodiment of the present invention. An internal combustion engine 1 shown in FIG. 1 is a four-stroke cycle diesel engine having four cylinders for use in driving a vehicle. An exhaust passage 2, through which an exhaust gas discharged from the internal combustion engine 1 passes, is connected to the internal combustion engine 1.

A selective reduction type NOx catalyst (hereinafter referred to as an SCR catalyst) 3 is arranged in the middle of the exhaust passage 2. The SCR catalyst 3 serves to reduce and purify NOx in an exhaust gas by the use of NH₃ (ammonia). For example, NO is reduced to N₂ by a reaction such as $4NO+4NH_3+O_2 \rightarrow 4N_2+6H_2O$. NO₂ is reduced to N₂ by a reaction such as $6NO_2+8NH_3 \rightarrow 7N_2+12H_2O$. NO and NO₂ are reduced to N₂ by a reaction such as $NO+NO_2+2NH_3 \rightarrow 2N_2+3H_2O$. In addition, the SCR catalyst 3 has a function to adsorb NH₃. The SCR catalyst 3 is formed of zeolite, etc. For example, the SCR catalyst 3 formed of zeolite includes alumina which is active spots to purify NOx by the use of NH₃, and silica which forms adsorption sites to adsorb NH₃, at a ratio of 1:20, etc. Here, note that in the SCR catalyst 3 formed except of zeolite, too, active spots are dotted while being surrounded by a plurality of adsorption sites.

A urea water addition valve 4, which adds a urea water solution (hereinafter referred to as urea water) as a reducing agent which is hydrolyzed into NH₃ to be supplied to the SCR catalyst 3, is arranged in the exhaust passage 2 at a location upstream of the SCR catalyst 3. From the urea water addition valve 4, the urea water stored in a urea water tank 5 is injected into the exhaust passage 2 based on a command. The urea water addition valve 4 corresponds to the reducing agent addition part of the present invention. As the reducing agent, there can be used an ammonia based solution such as an ammonia aqueous solution, besides urea water.

A first NOx sensor 6 to detect a NOx concentration in the exhaust gas flowing into the SCR catalyst 3 is arranged in the exhaust passage 2 at an immediately upstream side of the urea water addition valve 4. The first NOx sensor 6 corresponds to a first NOx concentration acquisition part of the present invention. A second NOx sensor 7 to detect a NOx concentration in the exhaust gas flowing out of the SCR catalyst 3 is arranged in the exhaust passage 2 at an immediately downstream side of the SCR catalyst 3. The second NOx sensor 7 corresponds to a second NOx concentration acquisition part of the present invention. A temperature sensor 8 to detect an SCR catalyst bed temperature is arranged in the SCR catalyst 3. The temperature sensor 8 corresponds to a catalyst temperature detection part of the present invention.

An electronic control unit (hereinafter referred to as an ECU) 9 is provided in combination with the internal combustion engine 1 as constructed in the above-mentioned manner. The first NOx sensor 6, the second NOx sensor 7, the temperature sensor 8, an unillustrated crank position sensor, and an unillustrated accelerator opening sensor are electrically connected to the ECU 9. The output signals of these sensors are inputted to the ECU 9. In addition, the urea water addition valve 4 is electrically connected to the ECU 9, so that the urea water addition valve 4 is controlled by the ECU 9.

(Urea Water Addition Control)

In the past, in cases where urea water is added to the SCR catalyst 3, there have been two kinds of methods. That which has mainly been used in the past is a method in which by making use of the function of the SCR catalyst 3 to adsorb NH₃, NH₃ is caused to be beforehand adsorbed to and held by the SCR catalyst 3 within a range which does not exceed a saturated amount of adsorption, and as the NH₃ held by the SCR catalyst is consumed by the reduction of NOx, an amount of urea water only corresponding to an amount of NH₃ thus consumed is supplied.

However, according to the knowledge of the present inventors, it has been found out that in cases where NH₃ required for the purification of NOx is caused to be beforehand adsorbed to the SCR catalyst 3 according to the above-mentioned method, and thereafter the addition of the urea water is stopped, the NOx purification rate becomes lower as compared with the case where the urea water is continuously added even if NH₃ has been adsorbed.

Figure 2:
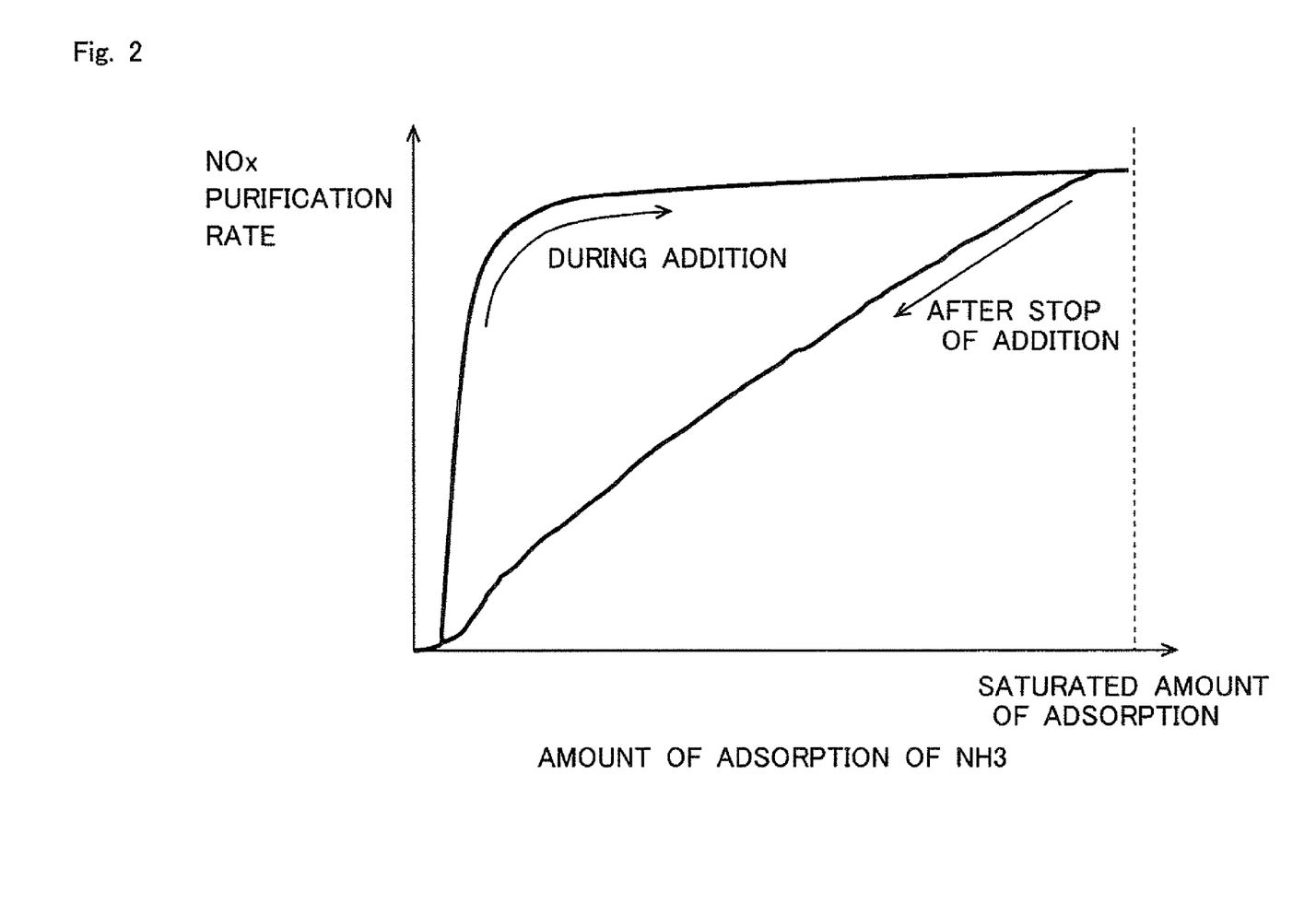
FIG. 2 is a view showing the relation between an amount of adsorption of NH₃ in an SCR catalyst and a NOx purification rate.

FIG. 2 is a view showing the relation between the amount of adsorption of NH₃ in the SCR catalyst 3 and the NOx purification rate. As shown in FIG. 2, when the amount of NH₃ required for the purification of the NOx is caused to be beforehand adsorbed to the SCR catalyst 3 according to the above-mentioned method and thereafter the addition of the urea water is stopped, the NOx purification rate becomes lower than that during the addition of the urea water. That is, even if the amount of adsorption of $NH_3$ to the SCR catalyst 3 is the same, the NOx purification rate is different between during the addition of the urea water and during the stop of the addition thereof, due to the presence of hysteresis. From the characteristics of the SCR catalyst 3 with such hysteresis, the NOx purification rate decreases in the above-mentioned method.

Figure 3:
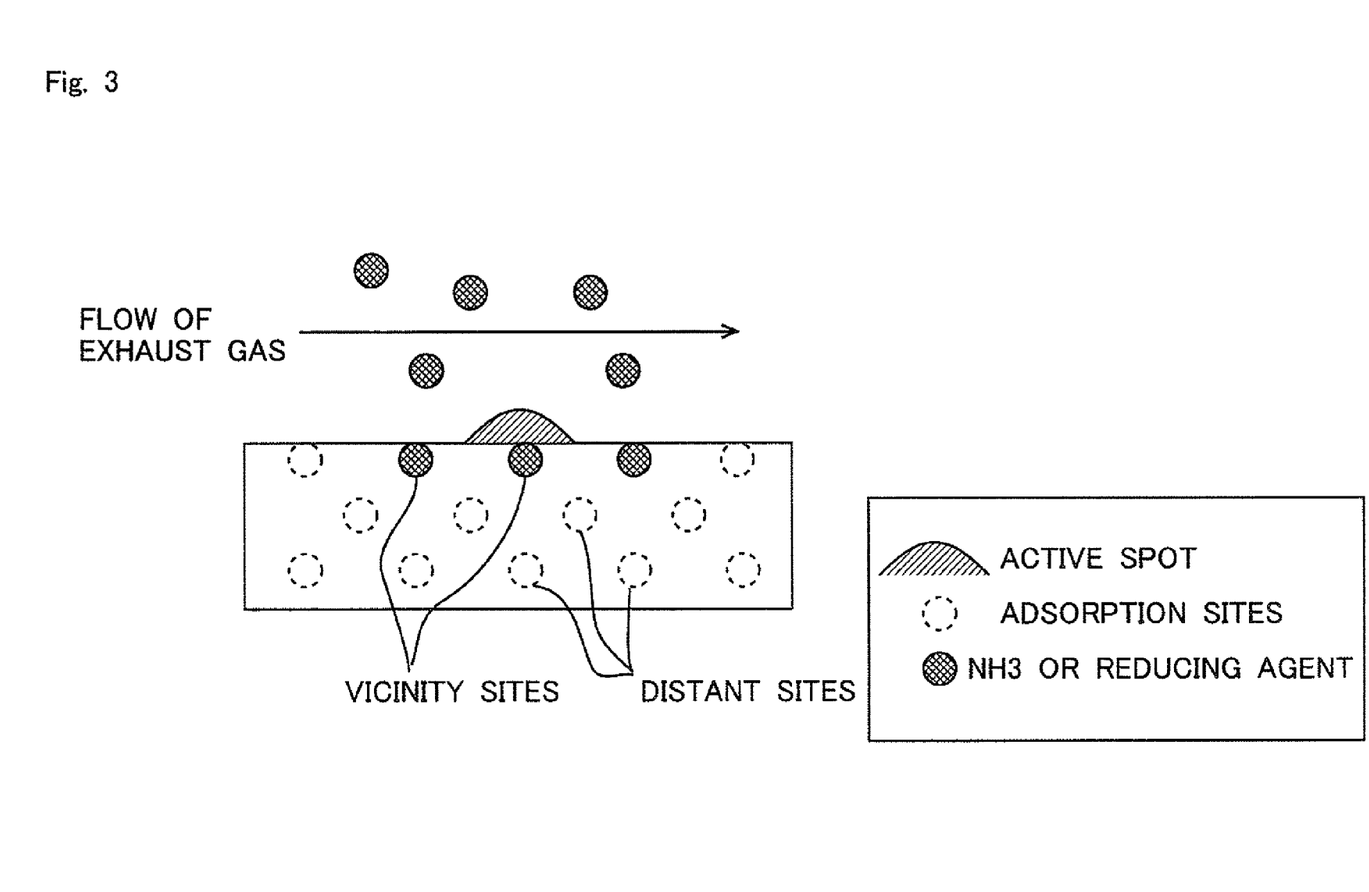
FIG. 3 is a view showing a state in which NH₃ is adsorbed to a vicinity site in the SCR catalyst.
Figure 4:
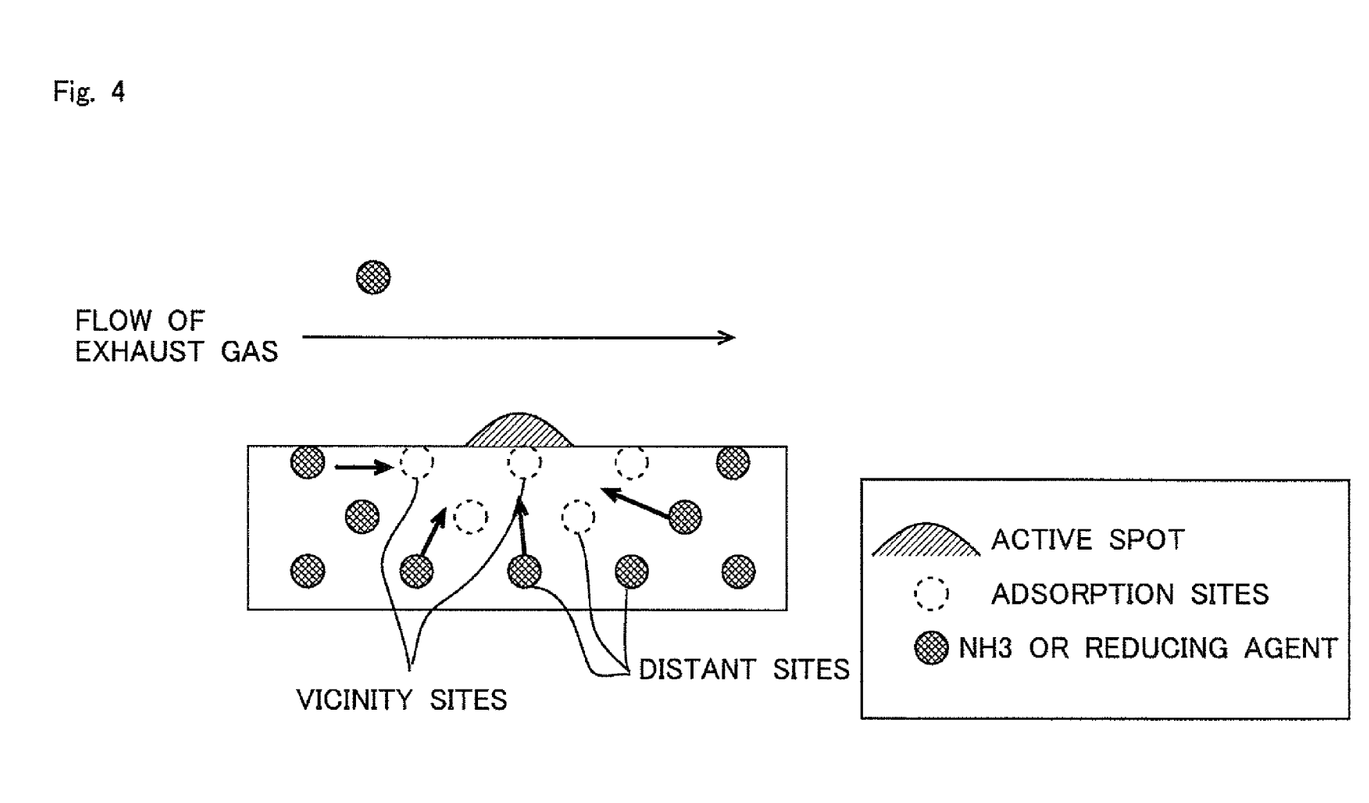
FIG. 4 is a view showing a state in which NH₃ is not adsorbed to the vicinity site in the SCR catalyst.

This is considered due to the following reasons. In the SCR catalyst 3, active spots which serve to purify NOx by the use of $NH_3$ are dotted, and at the same time, a plurality of adsorption sites which serve to adsorb $NH_3$ exist in the surroundings of the active spots. Vicinity sites among the adsorption sites, which are located in the vicinity of the active spots, are easier to deliver $NH_3$ to the active spots than distant sites which are located distant from the active spots. For this reason, the desorption rate of $NH_3$ in the vicinity sites due to the delivery of $NH_3$ to the active spots is faster than the desorption rate of $NH_3$ in the distant sites. FIG. 3 is a view showing a state in which $NH_3$ is adsorbed to vicinity sites. In other words, most of $NH_3$ used in an active spot is that which is in a gaseous phase of the exhaust gas or has been adsorbed to the vicinity sites, wherein the $NH_3$ which has been adsorbed to the vicinity sites is delivered to the active spot, as shown in FIG. 3, so that NOx is reduced by the $NH_3$ in the active spot. FIG. 4 is a view showing a state in which $NH_3$ is adsorbed to distant sites but not adsorbed to vicinity sites. The $NH_3$ adsorbed to the distant sites is delivered to the vicinity sites when the $NH_3$ adsorbed to the vicinity sites runs out, as shown in FIG. 4, but such a motion is slow, and hence, it becomes unable to purify the NOx in an active spot due to the absence of $NH_3$. In other words, the $NH_3$ adsorbed to the distant sites is difficult to be used in the active spot, and is difficult to contribute to the purification of the NOx. As a result, continuing to supply $NH_3$ to the vicinity sites by adding urea water in a continuous manner is able to purify the NOx more easily than using the $NH_3$ adsorbed to the distant sites by causing it to be desorbed therefrom. For this reason, it is considered that the NOx purification rate becomes higher in the case of adding urea water in a continuous manner than in the case of causing the $NH_3$ required for the purification of the NOx to be beforehand adsorbed to the SCR catalyst 3, and thereafter stopping the addition of urea water.

In addition, even in cases where urea water is added continuously, if the amount of addition is smaller with respect to the amount of NOx flowing into the SCR catalyst 3, e.g., if the amount of addition is such that an equivalent ratio thereof, which is the ratio of the amount of substance of $NH_3$ to the amount of substance of NOx, is an equivalent ratio of 0.5, the NOx purification rate becomes lower in comparison with an amount of addition at an equivalent ratio of 1. This is considered that if the amount of addition has an equivalent ratio of 0.5, it becomes impossible for the $NH_3$ adsorbed to the vicinity sites to continue to exist, and it becomes insufficient for the vicinity sites to deliver $NH_3$ to the active spot, as a result of which $NH_3$ to reduce the NOx in the active spot is short, and the NOx purification rate becomes lower.

Accordingly, in this embodiment, the addition of urea water from the urea water addition valve 4 is controlled based on the desorption rate of $NH_3$ in the vicinity sites so as to continue to cause the $NH_3$ adsorbed to the vicinity sites to exist. In other words, urea water is continued as much as possible to be supplied from the urea water addition valve 4, so that even if the vicinity sites deliver $NH_3$ to the active spot and the $NH_3$ is desorbed from the vicinity sites, new $NH_3$ can be caused to be adsorbed to the vicinity sites immediately. According to this, $NH_3$ is caused to continue to exist in the vicinity sites as much as possible, so the $NH_3$ adsorbed to the vicinity sites can always be delivered to the active spot, thereby making it possible to purify NOx. As a result, it is possible to maintain the NOx purification rate high.

Here, in this embodiment, attention is focused on the desorption rate of $NH_3$ in the vicinity sites. The desorption rate of $NH_3$ in the vicinity sites is a rate from the time when $NH_3$ is caused to be adsorbed to the vicinity sites until the time when the $NH_3$ is delivered to the active spot, and it can also be said as the rate of consumption of $NH_3$ in the vicinity sites. If the supply of $NH_3$ is slower with respect to the desorption rate of $NH_3$ in the vicinity sites, the vicinity sites will be in a state where $NH_3$ is not adsorbed to the vicinity sites, so it becomes impossible to purify the NOx, resulting in a decrease in the NOx purification rate. On the other hand, if the supply of $NH_3$ is faster with respect to the desorption rate of $NH_3$ in the vicinity sites, not only the vicinity sites but also the distant sites will adsorb $NH_3$, so that the saturation of the amount of adsorption of $NH_3$ in the SCR catalyst 3 will be caused, thus giving rise to the passage of $NH_3$ through to the downstream side of the SCR catalyst 3. For this reason, urea water is added in consideration of the desorption rate of $NH_3$ in the vicinity sites, so that the rate of supply of $NH_3$ becomes optimal with respect to the desorption rate of $NH_3$ in the vicinity sites, thus enabling the $NH_3$ adsorbed to the vicinity sites to continue to exist, and preventing $NH_3$ from being adsorbed to the distant sites as much as possible.

According to this embodiment, urea water can be added as continuously as possible, so that a decrease in the NOx purification rate can be avoided. In addition, the amount of urea water to be added continuously is only an amount of addition thereof which causes the $NH_3$ adsorbed to the vicinity sites to continue to exist, and the reducing agent is not added excessively, so it is also possible to avoid the $NH_3$ from passing through to the downstream side of the SCR catalyst 3.

In addition, according to this embodiment, the $NH_3$ adsorbed to the vicinity sites is caused to continue to exist, so temporary response delays such as a response delay in the supply control of urea water, a delay until urea water is hydrolyzed into $NH_3$, and so on can be absorbed by the $NH_3$ adsorbed to the vicinity sites. For this reason, even in cases where the amount of NOx discharged from the internal combustion engine 1 has changed rapidly, appropriate measures can be taken in time, thereby making it possible to provide an optimal amount of addition of urea water. As a result, it is difficult for $NH_3$ to pass through the SCR catalyst 3 to the downstream side thereof due to the excessive addition of urea water, or it is difficult for the NOx purification rate to be made lower due to the shortage of addition of urea water.

Figure 5:
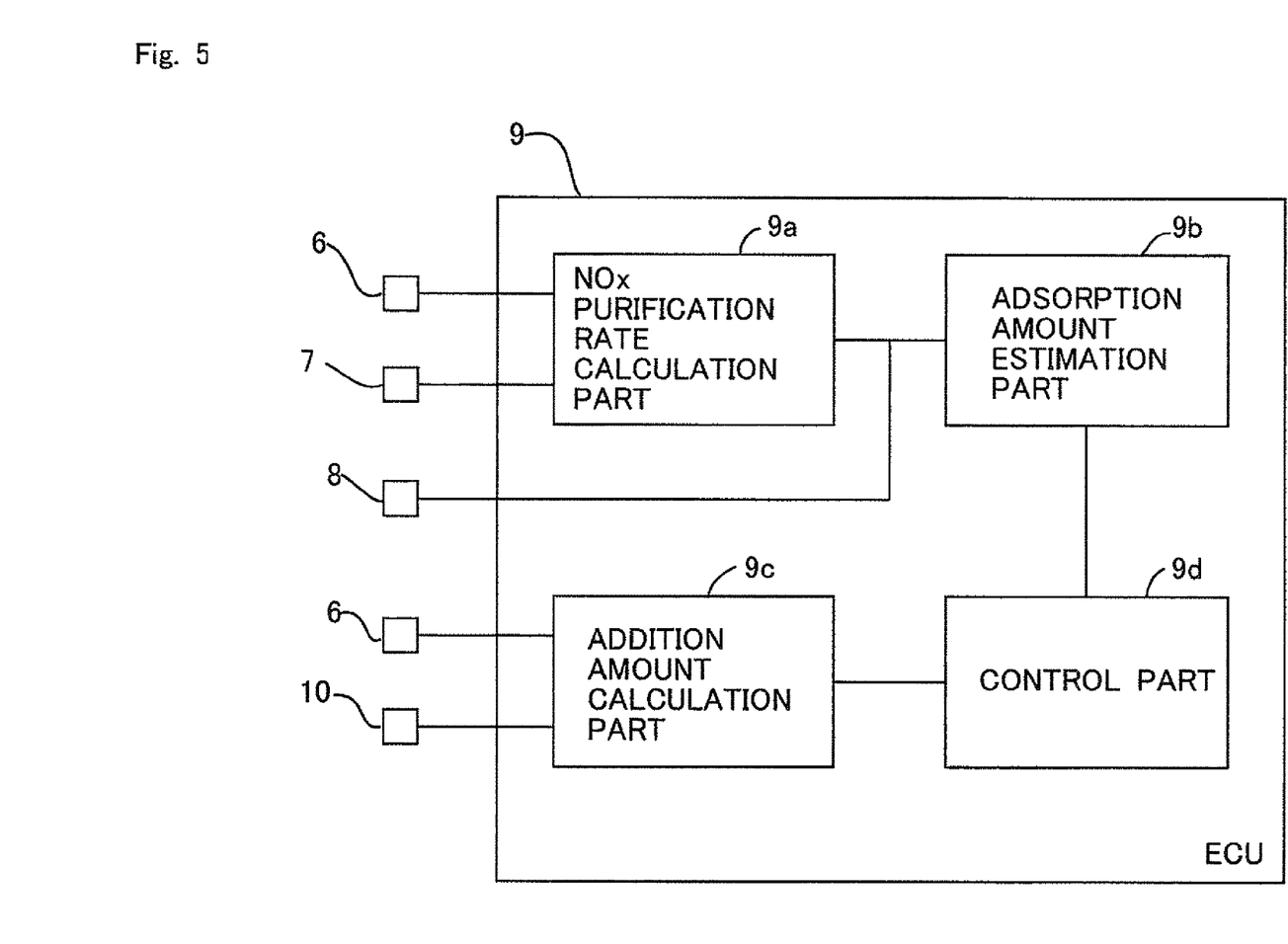
FIG. 5 is a view showing a control block inside an ECU according to the first embodiment.

FIG. 5 is a view showing a control block inside the ECU 9 according to this first embodiment. By the use of FIG. 5, reference will be made to a specific construction in which the addition of urea water from the urea water addition valve 4 is controlled based on the desorption rate of $NH_3$ in the vicinity sites so as to continue to cause the $NH_3$ adsorbed to the vicinity sites to exist.

As shown in FIG. 5, the ECU 9 has a NOx purification rate calculation part 9*a* that calculates the NOx purification rate in the SCR catalyst 3 from the NOx concentrations acquired by the first NOx sensor 6 and the second NOx sensor 7, respectively. In addition, the ECU 9 has an adsorption amount estimation part 9*b* that estimates the amount of adsorption of $NH_3$ in the SCR catalyst 3 based on the NOx purification rate calculated by the NOx purification rate calculation part 9*a* and the SCR catalyst bed temperature detected by the temperature sensor 8.

On the other hand, the ECU 9 has an addition amount calculation part 9c that calculates a predetermined equivalent ratio addition amount, which causes the $NH_3$ adsorbed to the vicinity sites to continue to exist, of urea water to be added from the urea water addition valve 4, based on the amount of NOx flowing into the SCR catalyst 3 which is calculated from the desorption rate of $NH_3$ in the vicinity sites, the NOx concentration acquired by the first NOx sensor 6, and the amount of air detected by an air flow meter 10 arranged in the intake passage of the internal combustion engine 1.

Here, the predetermined equivalent ratio addition amount is an amount of addition which can cause the $NH_3$ adsorbed to the vicinity sites to continue to exist, while purifying the NOx by the SCR catalyst 3, by taking into consideration the desorption rate of $NH_3$ in the vicinity sites and the amount of NOx flowing into the SCR catalyst 3. In this embodiment, the explanation will be made on the assumption that the predetermined equivalent ratio addition amount is an amount of addition of urea water in which the equivalent ratio thereof, being the ratio of the amount of substance of $NH_3$, which performs a reduction reaction with NOx, to the amount of substance of NOx, is an equivalent ratio of 1. The amount of addition of urea water with an equivalent ratio 1 is an amount thereof in which $NH_3$ generated by hydrolysis from urea water can perform a reduction reaction with NOx at a ratio of 1 to 1. This is because the desorption rate of $NH_3$ in the vicinity sites is assumed to be equal to the reduction rate of NOx using $NH_3$ in the active spot.

However, for the desorption rate of $NH_3$ in the vicinity sites, it is possible to take into consideration an amount of adsorption of $NH_3$ which has beforehand been adsorbed to the vicinity sites, a maximum permissible amount of adsorption of $NH_3$ in the vicinity sites, etc., besides the reduction reaction of NOx. For this reason, the predetermined equivalent ratio addition amount may also be an amount of addition of urea water with an equivalent ratio, besides the equivalent ratio of 1, which is a value around the equivalent ratio of 1, or in some cases, an equivalent ratio of about 0.5, or an equivalent ratio of about 1.5. However, in the case of an amount of addition of urea water having an equivalent ratio of about 0.5, $NH_3$ which is adsorbed to the vicinity sites may become small, resulting in a low NOx purification rate. In the case of an amount of addition of urea water having an equivalent ratio of about 1.5, the amount of adsorption of $NH_3$ in the SCR catalyst 3 will be saturated at an early stage. As a result, it is preferable that the amount of addition of urea water have an equivalent ratio of around 1.

In addition, the predetermined equivalent ratio addition amount of this embodiment is explained as an amount of addition of urea water with an equivalent ratio thereof being relatively fixed with respect to the amount of NOx flowing into the SCR catalyst 3, and being maintained as it is the equivalent ratio of 1. However, the predetermined equivalent ratio addition amount may also be an amount with an equivalent ratio being changed in accordance with situations such as the amount of NOx, the catalytic state of the SCR catalyst 3, etc., besides the amount with its equivalent ratio being relatively fixed with respect to the amount of NOx flowing into the SCR catalyst 3. For this reason, for example, the predetermined equivalent ratio addition amount may be changed in accordance with the bed temperature of the SCR catalyst 3 or the amount of adsorption of $NH_3$ in the SCR catalyst 3.

Moreover, the ECU 9 has a control part 9d that carries out urea water addition control by controlling the urea water addition valve 4 based on the amount of adsorption of $NH_3$ in the SCR catalyst 3 estimated by the adsorption amount estimation part 9b, and the predetermined equivalent ratio addition amount calculated by the addition amount calculation part 9c.

Figure 6:
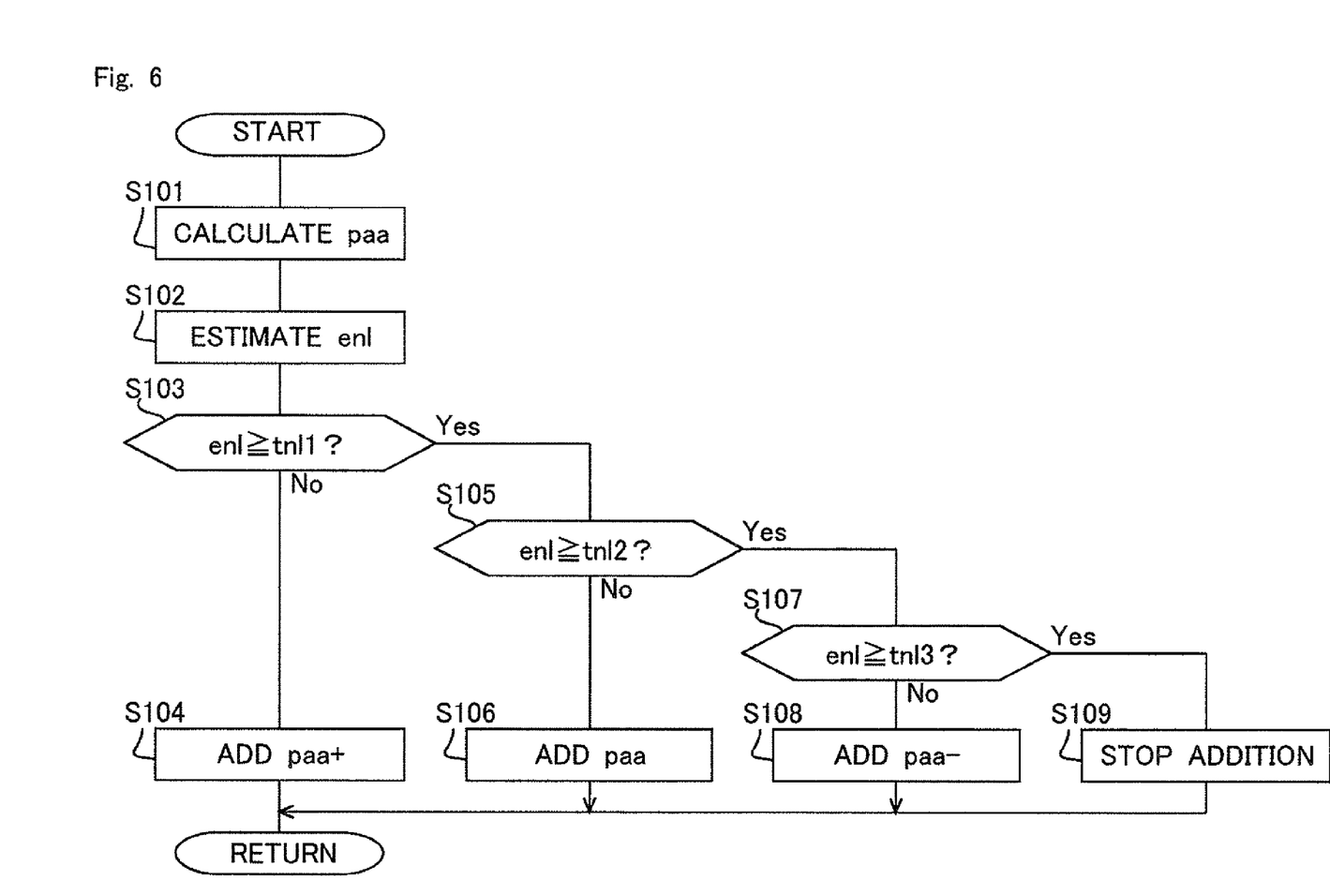
FIG. 6 is a flow chart showing a urea water addition control routine according to the first embodiment.

Reference will be made to a urea water addition control routine carried out by the ECU 9 based on a flow chart shown in FIG. 6. FIG. 6 is the flow chart showing the urea water addition control routine. This routine is repeatedly carried out by means of the ECU at each predetermined time interval, in particular so that the addition of urea water is continued.

When the routine shown in FIG. 6 is started, in step S101, a predetermined equivalent ratio addition amount paa is calculated by the addition amount calculation part 9c. In this embodiment, by assuming that the desorption rate of $NH_3$ in the vicinity sites is equal to a NOx reduction reaction rate, and using the amount of NOx flowing into the SCR catalyst 3 calculated from the NOx concentration acquired by the first NOx sensor 6 and the amount of air detected by the air flow meter 10, an amount of addition of urea water becoming an equivalent ratio of 1 is calculated.

In step S102, an amount of adsorption enl of $NH_3$ in the SCR catalyst 3 is estimated by the adsorption amount estimation part 9b.

In step S103, it is determined whether the amount of adsorption enl of $NH_3$ in the SCR catalyst 3 estimated in step S102 is equal to or greater than a first target adsorption amount tnl1. The first target adsorption amount tnl1 is an amount of adsorption which becomes a threshold value for whether $NH_3$ has not been adsorbed to vicinity sites in the SCR catalyst 3, or $NH_3$ has been adsorbed to the vicinity sites, and it changes in accordance with the SCR catalyst bed temperature. A characteristic curve of the first target adsorption amount tnl1 can be beforehand defined as a map by experiments, verification, etc. For this reason, when processing this step, the first target adsorption amount tnl1 is derived by taking the SCR catalyst bed temperature detected by the temperature sensor 8 into the map of the characteristic curve of the first target adsorption amount tnl1.

In step S103, in cases where a negative determination is made in which the amount of adsorption enl of $NH_3$ in the SCR catalyst 3 thus estimated is not equal to or greater than the first target adsorption amount tnl1, the routine shifts to step S104. However, in step S103, in cases where an affirmative determination is made in which the amount of adsorption enl of $NH_3$ in the SCR catalyst 3 thus estimated is equal to or greater than the first target adsorption amount tnl1, the routine shifts to step S105.

In step S104, the control part 9d adds, from the urea water addition valve 4, an amount of urea water paa+ which has been increased from the predetermined equivalent ratio addition amount. The amount of urea water paa+ here, which has been increased from the predetermined equivalent ratio addition amount, is, for example, a preset amount of addition more than the predetermined equivalent ratio addition amount, or is increased by adding a preset amount of addition to the predetermined equivalent ratio addition amount. The urea water paa+, which has been increased from the predetermined equivalent ratio addition amount, should be larger as compared with the predetermined equivalent ratio addition amount for causing the $NH_3$ adsorbed to the vicinity sites to continue to exist, and may not be related to the predetermined equivalent ratio addition amount. In other words, the urea water paa+may be determined without taking the equivalent ratio into consideration. According to this step, in cases where $NH_3$ has not been adsorbed to the vicinity sites, by increasing the amount of urea water to be added, $NH_3$ can be caused to be adsorbed to the vicinity sites at an early stage, thus making it possible to enhance the NOx purification rate. Here, note that the case where $NH_3$ has not been adsorbed to the vicinity sites includes, for example, the case where the SCR catalyst 3 begins to be used, such as at the time of starting of the internal combustion engine 1, etc. After the processing of this step, this routine is once ended.

In step S105, it is determined whether the amount of adsorption enl of $NH_3$ in the SCR catalyst 3 estimated in step S102 is equal to or greater than a second target adsorption amount tnl2. The second target adsorption amount tnl2 is an amount of adsorption which is greater than the first target adsorption amount tnl1 and which becomes a threshold value for whether the amount of adsorption of $NH_3$ in the SCR catalyst 3 is not near its saturation or the amount of adsorption of $NH_3$ is near its saturation, and it changes in accordance with the SCR catalyst bed temperature. A characteristic curve of the second target adsorption amount tnl2 can be beforehand defined as a map by experiments, verification, etc. For this reason, at the time of processing this step, the second target adsorption amount tnl2 is derived by taking the SCR catalyst bed temperature detected by the temperature sensor 8 into the map of the characteristic curve of the second target adsorption amount tnl2.

In step S105, in cases where a negative determination is made in which the amount of adsorption enl of $NH_3$ in the SCR catalyst 3 thus estimated is not equal to or greater than the second target adsorption amount tnl2, the routine shifts to step S106. However, in step S105, in cases where an affirmative determination is made in which the amount of adsorption enl of $NH_3$ in the SCR catalyst 3 thus estimated is equal to or greater than the second target adsorption amount tnl2, the routine shifts to step S107.

In step S106, the control part 9d adds, from the urea water addition valve 4, an amount of urea water which is the predetermined equivalent ratio addition amount paa. In this embodiment, urea water is added in an amount of addition which becomes an equivalent ratio of 1. According to this step, in cases where the $NH_3$ adsorbed to the vicinity sites is caused to continue to exist, it is possible to continue to add an optimal amount of urea water which is the predetermined equivalent ratio addition amount paa, and so a high NOx purification rate can be maintained. After the processing of this step, this routine is once ended.

In step S107, it is determined whether the amount of adsorption enl of $NH_3$ in the SCR catalyst 3 estimated in step S102 is equal to or greater than a third target adsorption amount tnl3. The third target adsorption amount tnl3 is an amount of adsorption which is greater than the second target adsorption amount tnl2 and which becomes a threshold value for whether the amount of adsorption of $NH_3$ in the SCR catalyst 3 is near its saturation or has reached the saturated amount of adsorption, and it changes in accordance with the SCR catalyst bed temperature. A characteristic curve of the third target adsorption amount tnl3 can be beforehand defined as a map by experiments, verification, etc. For this reason, at the time of processing this step, the third target adsorption amount tnl3 is derived by taking the SCR catalyst bed temperature detected by the temperature sensor 8 into the map of the characteristic curve of the third target adsorption amount tnl3.

In step S107, in cases where a negative determination is made in which the amount of adsorption enl of $NH_3$ in the SCR catalyst 3 thus estimated is not equal to or greater than the third target adsorption amount tnl3, the routine shifts to step S108. However, in step S107, in cases where an affirmative determination is made in which the amount of adsorption enl of $NH_3$ in the SCR catalyst 3 thus estimated is equal to or greater than the third target adsorption amount tnl3, the routine shifts to step S109.

In step S108, the control part 9d adds, from the urea water addition valve 4, an amount of urea water paa− which has been decreased from the predetermined equivalent ratio addition amount. The amount of urea water paa− here, which has been decreased from the predetermined equivalent ratio addition amount, is, for example, a preset amount of addition smaller than the predetermined equivalent ratio addition amount, or is decreased by multiplying the predetermined equivalent ratio addition amount by a preset coefficient. According to this step, in cases where the amount of adsorption of $NH_3$ in the SCR catalyst 3 comes near its saturation, it is possible to avoid $NH_3$ from passing through to the downstream side of the SCR catalyst 3 by adding the amount of urea water paa− which is smaller than the predetermined equivalent ratio addition amount. In addition, it is possible to maintain the NOx purification rate over a long period of time by continuing to add urea water even in a small amount in a continuous manner, rather than by adding the amount of urea water paa and stopping the addition thereof at an early stage. After the processing of this step, this routine is once ended.

In step S109, the control part 9 stops the addition of the urea water from the urea water addition valve 4. According to this step, in cases where the saturated amount of adsorption of $NH_3$ in the SCR catalyst 3 has been reached, the addition of the urea water is stopped, thereby making it possible to avoid with certainty the $NH_3$ from passing through to the downstream side of the SCR catalyst 3. After the processing of this step, this routine is once ended.

Figure 7:
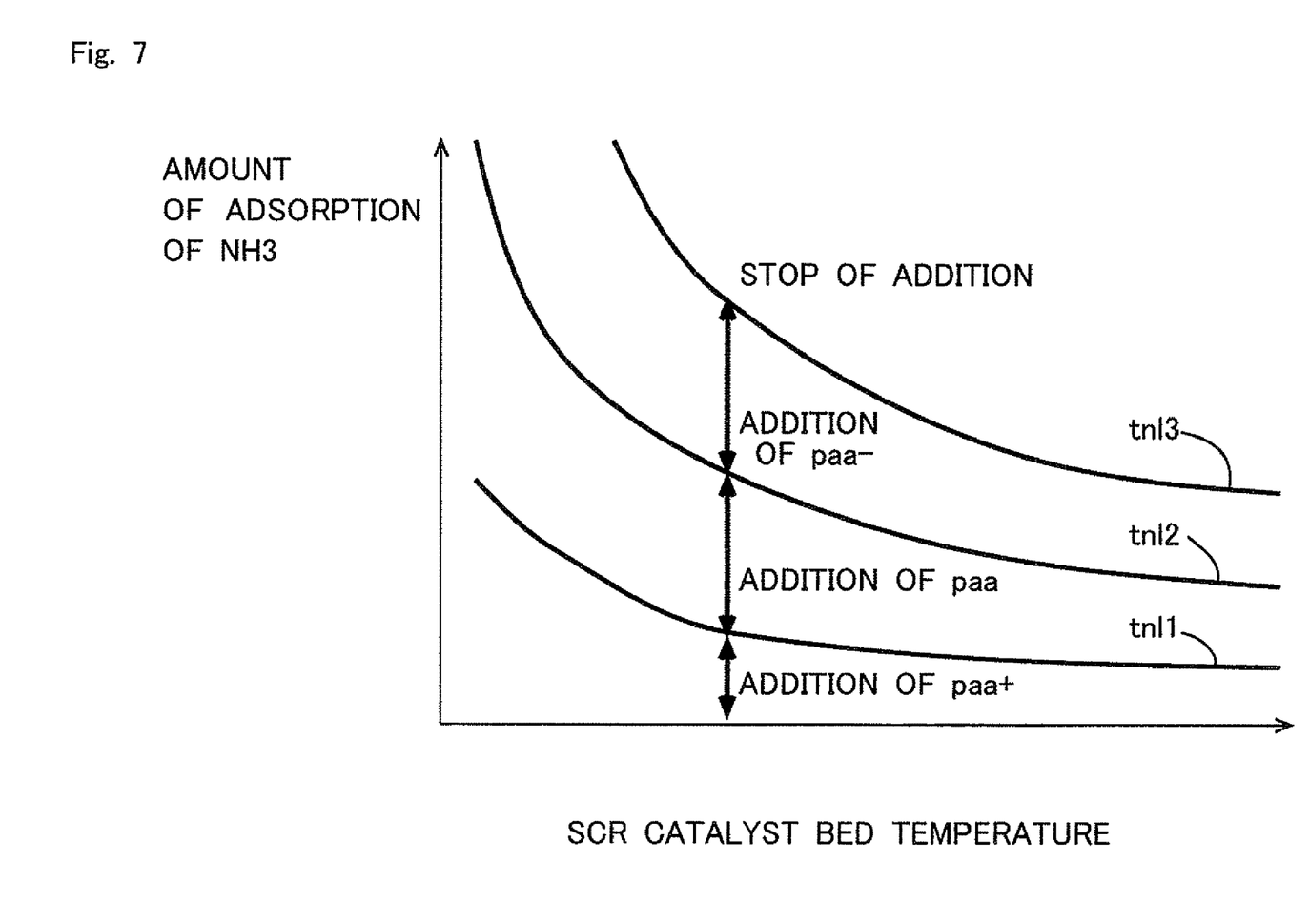
FIG. 7 is a view showing urea water addition control from the relation between an SCR catalyst bed temperature and an amount of adsorption of NH₃ in the SCR catalyst according to the first embodiment.

FIG. 7 is a view showing the urea water addition control according to this routine from the relation between the SCR catalyst bed temperature and the amount of adsorption of $NH_3$ in the SCR catalyst 3. As shown in FIG. 7, when the amount of adsorption of $NH_3$ in the SCR catalyst 3 is less than the first target adsorption amount tnl1, the amount of urea water paa+, which has been increased from the predetermined equivalent ratio addition amount, is added. When the amount of adsorption of $NH_3$ in the SCR catalyst 3 is equal to or more than the first target adsorption amount tnl1 and less than the second target adsorption amount tnl2, the amount of urea water paa equal to the predetermined equivalent ratio addition amount is added. When the amount of adsorption of $NH_3$ in the SCR catalyst 3 is equal to or more than the second target adsorption amount tnl2 and less than the third target adsorption amount tnl3, the amount of urea water paa− decreased from the predetermined equivalent ratio addition amount is added. When the amount of adsorption of $NH_3$ in the SCR catalyst 3 is equal to or more than the third target adsorption amount tnl3, the addition of urea water is stopped.

Figure 8:
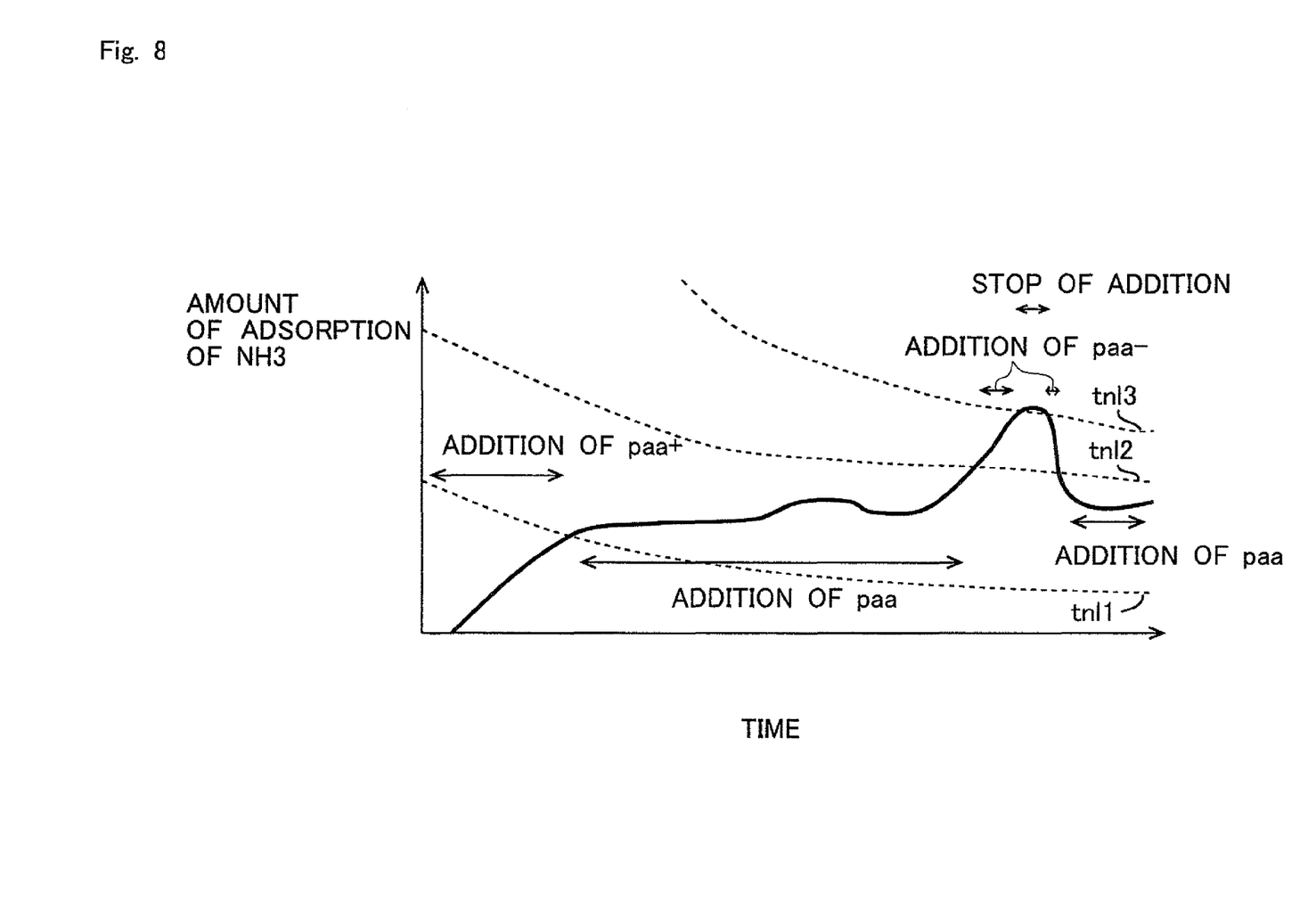
FIG. 8 is a view showing a change over time of the amount of adsorption of NH₃ in the SCR catalyst at the time of executing the urea water addition control according to the first embodiment.

FIG. 8 is a view showing the change over time of the amount of adsorption of $NH_3$ in the SCR catalyst 3 at the time of executing the urea water addition control according to this embodiment. As shown in FIG. 8, when the internal combustion engine 1 is started, the amount of adsorption of $NH_3$ in the SCR catalyst 3 is less than the first target adsorption amount tnl1, so the amount of urea water paa+, which has been increased from the predetermined equivalent ratio addition amount, is added to cause $NH_3$ to be adsorbed to vicinity sites at an early state. When the amount of adsorption of $NH_3$ in the SCR catalyst 3 becomes equal to or more than the first target adsorption amount tnl1, the urea water paa of the predetermined equivalent ratio addition amount is added, so that the $NH_3$ adsorbed to the vicinity sites is caused to continue to exist. When the amount of adsorption of $NH_3$ in the SCR catalyst 3 becomes equal to or more than the second target adsorption amount tnl2, the urea water paa–, which has been decreased from the predetermined equivalent ratio addition amount, is added, thereby avoiding $NH_3$ from passing through to the downstream side of the SCR catalyst 3. Despite that, however, in cases where the amount of adsorption of $NH_3$ in the SCR catalyst 3 becomes equal to or more than the third target adsorption amount tnl3, the addition of urea water is stopped, thereby avoiding $NH_3$ from passing through to the downstream side of the SCR catalyst 3 with certainty. Then, in cases where the $NH_3$ adsorbed to the adsorption sites is desorbed therefrom to decrease the amount of adsorption of $NH_3$ in the SCR catalyst 3, urea water is added again.

In other words, this control first adds, at the time of the start of the addition of urea water, a larger amount of urea water than an amount which causes the $NH_3$ adsorbed to the vicinity sites to continue to exist, until the time $NH_3$ is caused to be adsorbed to the vicinity sites during the course in which the amount of adsorption of $NH_3$ in the SCR catalyst 3 comes to the saturated amount of adsorption. After $NH_3$ has been adsorbed to the vicinity sites, an amount of urea water to cause the $NH_3$ adsorbed to the vicinity sites to continue to exist successively continues to be added. Here, in cases where the amount of adsorption of $NH_3$ in the SCR catalyst 3 comes near its saturation, the amount of addition of urea water is once reduced or the addition of urea water is once stopped, though the amount of urea water to cause the $NH_3$ adsorbed to the vicinity sites to continue to exist has continued to be added.

According to this routine explained above, urea water is added as continuously as possible, so that a decrease in the NOx purification rate can be avoided.

(Others)

Figure 9:
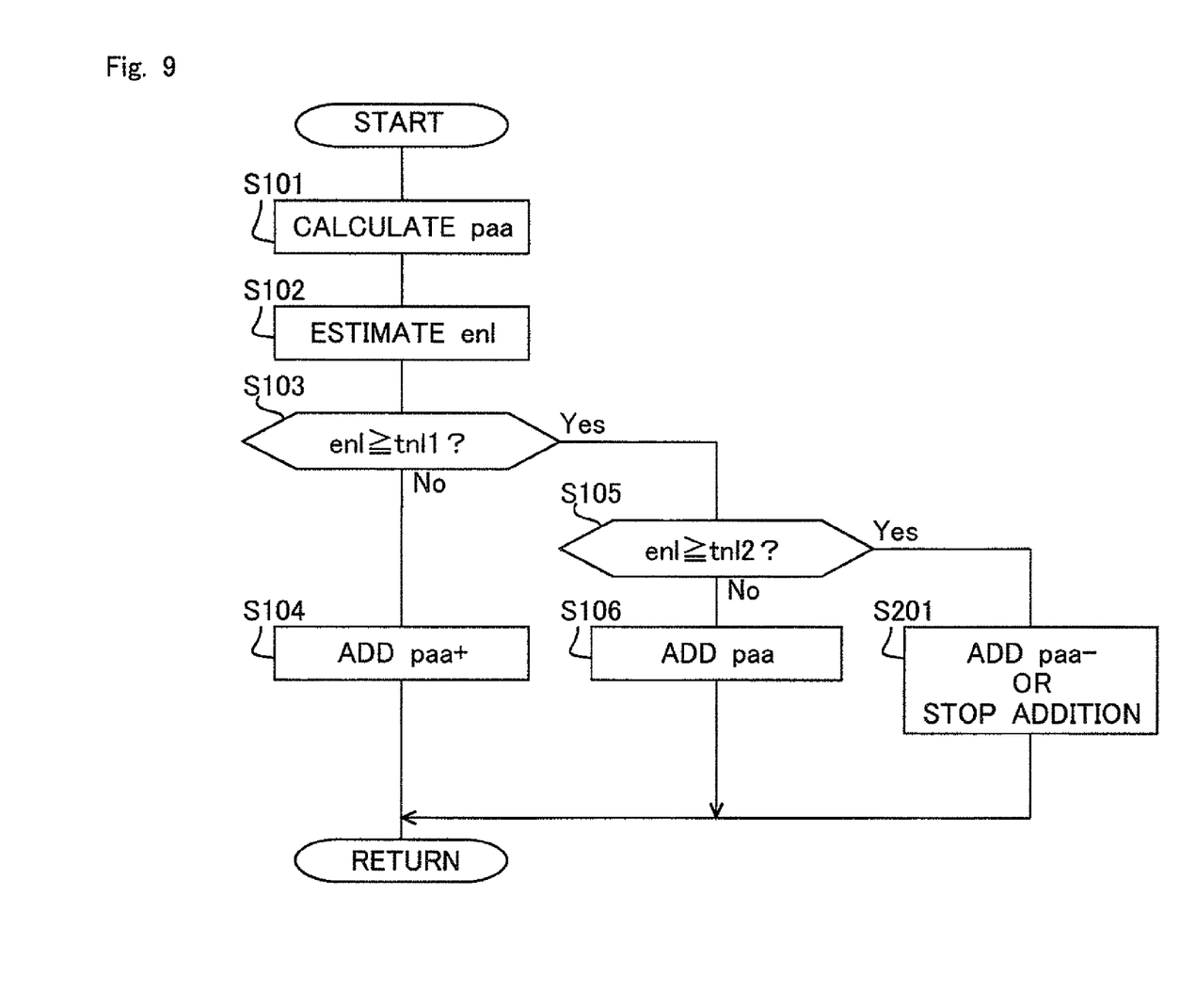
FIG. 9 is a flow chart showing a urea water addition control routine according to another example of the first embodiment.

Here, note that in this embodiment, the third target adsorption amount for comparison with the amount of adsorption of $NH_3$ in the SCR catalyst 3 has been set. However, the present invention is not limited to this. FIG. 9 is a flow chart showing a urea water addition control routine. As shown in FIG. 9, in cases where the amount of adsorption of $NH_3$ in the SCR catalyst 3 has become equal to or more than the second target adsorption amount tnl2 without setting the third target adsorption amount, in step S201, the amount of urea water paa–, which has been decreased from the predetermined equivalent ratio addition amount, may be added from the urea water addition valve 4, or the addition of urea water may be stopped. For example, there can be adopted a method in which the amount of decrease of urea water is increased in accordance with the increasing amount of adsorption of $NH_3$ in the SCR catalyst 3 which is equal or more than the second target adsorption amount, and the addition of urea water is stopped at a final stage.

An exhaust gas purification apparatus of an internal combustion engine according to the present invention is not limited to the above-mentioned embodiments, but can be subjected to various changes and modifications within the scope not departing from the gist of the present invention.

EXPLANATION OF REFERENCE NUMERALS AND CHARACTERS

1: internal combustion engine
2: exhaust passage
3: SCR catalyst
4: urea water addition valve
5: urea water tank
6: first NOx sensor
7: second NOx sensor
8: temperature sensor
9: ECU
9a: purification rate calculation part
9b: adsorption amount estimation part
9c: addition amount calculation part
9d: control part
10: air flow meter

The invention claimed is:

1. An exhaust gas purification apparatus of an internal combustion engine comprising:
   a selective reduction type NOx catalyst that is arranged in an exhaust passage of the internal combustion engine; and
   a reducing agent addition part that is arranged in said exhaust passage at an upstream side of said selective reduction type NOx catalyst, and adds a reducing agent for supplying $NH_3$ to said selective reduction type NOx catalyst;
   wherein
   said selective reduction type NOx catalyst has an active spot which purifies NOx by the use of $NH_3$, and an adsorption site which adsorbs $NH_3$;
   a vicinity site, which is located in the vicinity of said active spot, and a distant site, which is located distant from said active spot, exist in said adsorption site;
   said vicinity site tends to deliver $NH_3$ to said active spot more easily than said distant site does, and the desorption rate of $NH_3$ in said vicinity site is faster than the desorption rate of $NH_3$ in said distant site; and
   a control part is provided which controls the addition of the reducing agent from said reducing agent addition part based on the desorption rate of $NH_3$ in said vicinity site so as to continue to cause the $NH_3$ adsorbed to said vicinity site to exist.

2. The exhaust gas purification apparatus of an internal combustion engine as set forth in claim 1,
   wherein said control part continues to add the reducing agent until the amount of adsorption of $NH_3$ in said selective reduction type NOx catalyst comes near its saturation.

3. The exhaust gas purification apparatus of an internal combustion engine as set forth in claim 1, wherein
   in cases where $NH_3$ has not been adsorbed to said vicinity site, said control part adds the reducing agent in an amount increased from that in cases where the $NH_3$ adsorbed to said vicinity site is caused to continue to exist.

4. The exhaust gas purification apparatus of an internal combustion engine as set forth in claim 1, further comprising:
   an addition amount calculation part that calculates, based on the desorption rate of $NH_3$ in said vicinity site and an amount of NOx flowing into said selective reduction type NOx catalyst, a predetermined equivalent ratio addition amount, which causes the $NH_3$ adsorbed to said vicinity site to continue to exist, of the reducing agent to be added from said reducing agent addition part;
   wherein said control part adds the reducing agent in an amount more than the predetermined equivalent ratio addition amount in cases where $NH_3$ has not been adsorbed to said vicinity site, based on the predetermined equivalent ratio addition amount calculated by said addition amount calculation part, adds the reducing agent in the predetermined equivalent ratio addition amount in cases where the $NH_3$ adsorbed to said vicinity site is caused to continue to exist, and adds the reducing agent in an amount less than the predetermined equivalent ratio addition amount or stops the addition of the reducing agent in cases where the amount of adsorption of $NH_3$ in said selective reduction type NOx catalyst has come near its saturation.

5. The exhaust gas purification apparatus of an internal combustion engine as set forth in claim 1, further comprising:
- a first NOx concentration acquisition part that acquires the concentration of NOx in an exhaust gas which flows into said selective reduction type NOx catalyst;
- a second NOx concentration acquisition part that acquires the concentration of NOx in an exhaust gas which flows out of said selective reduction type NOx catalyst;
- a NOx purification rate calculation part that calculates a NOx purification rate in said selective reduction type NOx catalyst from the NOx concentrations acquired by said first NOx concentration acquisition part and said second NOx concentration acquisition part;
- a catalyst temperature detection part that detects the temperature of said selective reduction type NOx catalyst;
- an adsorption amount estimation part that estimates the amount of adsorption of $NH_3$ in said selective reduction type NOx catalyst based on the NOx purification rate calculated by said NOx purification rate calculation part and the catalyst temperature detected by said catalyst temperature detection part; and
- an addition amount calculation part that calculates a predetermined equivalent ratio addition amount, which causes the $NH_3$ adsorbed to said vicinity sites to continue to exist, of the reducing agent to be added from said reducing agent addition part, based on the desorption rate of $NH_3$ in said vicinity site, and an amount of NOx flowing into said selective reduction type NOx catalyst which is calculated from the NOx concentration acquired by the first NOx concentration acquisition part and an amount of air;
- wherein a first target adsorption amount, which becomes a threshold value for whether $NH_3$ has not been adsorbed to said vicinity site in said selective reduction type NOx catalyst or $NH_3$ has been adsorbed to said vicinity site, and a second target adsorption amount, which is more than the first target adsorption amount and which becomes a threshold value for whether the amount of adsorption of $NH_3$ in said selective reduction type NOx catalyst does not come near its saturation or the amount of adsorption thereof comes near its saturation, are set; and
- wherein said control part adds the reducing agent in an amount more than the predetermined equivalent ratio addition amount in cases where the amount of adsorption estimated by said adsorption amount estimation part is less than the first target adsorption amount, based on the predetermined equivalent ratio addition amount calculated by said addition amount calculation part, adds the reducing agent in the predetermined equivalent ratio addition amount in cases where the amount of adsorption estimated by said adsorption amount estimation part is equal to or more than the first target adsorption amount and is less than the second target adsorption amount, and adds the reducing agent in an amount less than the predetermined equivalent ratio addition amount or stops the addition of the reducing agent in cases where the amount of adsorption estimated by said adsorption amount estimation part is equal to or more than the second target adsorption amount.

6. A reducing agent addition method in an exhaust gas purification apparatus of an internal combustion engine which is provided with:
- a selective reduction type NOx catalyst that is arranged in an exhaust passage of the internal combustion engine; and
- a reducing agent addition part that is arranged in said exhaust passage at an upstream side of said selective reduction type NOx catalyst, and adds a reducing agent for supplying $NH_3$ to said selective reduction type NOx catalyst;
- wherein
- said selective reduction type NOx catalyst has an active spot which purifies NOx by the use of $NH_3$, and an adsorption site which adsorbs $NH_3$;
- a vicinity site, which is located in the vicinity of said active spot, and a distant site, which is located distant from said active spot, exist in said adsorption site;
- said vicinity site tends to deliver $NH_3$ to said active spot more easily than said distant site does, and the desorption rate of $NH_3$ in said vicinity site is faster than the desorption rate of $NH_3$ in said distant site; and
- the addition of the reducing agent from said reducing agent addition part is controlled based on the desorption rate of $NH_3$ in said vicinity site so as to continue to cause the $NH_3$ adsorbed to said vicinity site to exist.

* * * * *